United States Patent
Chen

(10) Patent No.: US 10,072,213 B2
(45) Date of Patent: Sep. 11, 2018

(54) FIREPROOF MATERIAL INCORPORATING AEROGEL WITH ORGANIC FOAM MATERIAL AND METHOD FOR MAKING THE SAME

(71) Applicant: Jean-Hong Chen, Tainan (TW)

(72) Inventor: Jean-Hong Chen, Tainan (TW)

( * ) Notice: Subject to any disclaimer, the term of this patent is extended or adjusted under 35 U.S.C. 154(b) by 107 days.

(21) Appl. No.: 15/298,452

(22) Filed: Oct. 20, 2016

(65) Prior Publication Data

US 2018/0112134 A1 Apr. 26, 2018

(51) Int. Cl.
*C09K 21/14* (2006.01)
*C08J 9/35* (2006.01)
*C08J 9/40* (2006.01)

(52) U.S. Cl.
CPC ............ *C09K 21/14* (2013.01); *C08J 9/405* (2013.01); *C08J 2201/036* (2013.01); *C08J 2205/026* (2013.01); *C08J 2205/052* (2013.01); *C08J 2300/12* (2013.01)

(58) Field of Classification Search
CPC ..... C08K 21/14; C08J 9/405; C08J 2201/036; C08J 2205/026
See application file for complete search history.

(56) References Cited

U.S. PATENT DOCUMENTS

| | | | | |
|---|---|---|---|---|
| 6,040,375 A | * | 3/2000 | Behme | C04B 26/02 264/15 |
| 2012/0007012 A1 | * | 1/2012 | Fricke | C08G 18/3243 252/62 |
| 2012/0142802 A1 | * | 6/2012 | Steinke | C08G 12/32 521/187 |
| 2016/0096949 A1 | * | 4/2016 | Evans | C08K 3/04 521/122 |

* cited by examiner

*Primary Examiner* — Kara B Boyle
(74) *Attorney, Agent, or Firm* — Rosenberg, Klein & Lee

(57) ABSTRACT

A fireproof material incorporating aerogel with an organic foam material and a method for making the same are provided. The method is carried out as follows: A. a mixed solution of a precursor and an organic solvent is added with an acid catalyst and becomes an anhydrous aerogel solution through hydrolysis; B. the anhydrous aerogel solution is added with an aqueous alkali catalyst solution and forms an aerogel solution through condensation; C. an organic foam material is impregnated with the aerogel solution such that aerogel is generated by gelation and is incorporated with the organic foam material, forming a three-dimensional reticular structure; and D. the organic foam material incorporated with the aerogel is dried and then shaped to produce a fireproof material. The fireproof material is highly proof against fire and can pass the limiting oxygen index test.

7 Claims, 5 Drawing Sheets

A. Add an acid catalyst into a mixed solution of a precursor and an organic solvent such that the mixed solution becomes an anhydrous aerogel solution through hydrolysis.

B. Add an aqueous alkali catalyst solution into the anhydrous aerogel solution such that the anhydrous aerogel solution forms an aerogel solution through condensation.

C. Impregnate an organic foam material with the aerogel solution such that aerogel is generated through gelation and is incorporated with the organic foam material, forming a three-dimensional reticular structure.

D. Dry and then shape the organic foam material incorporated with the aerogel to form a fireproof material.

FIG. 1

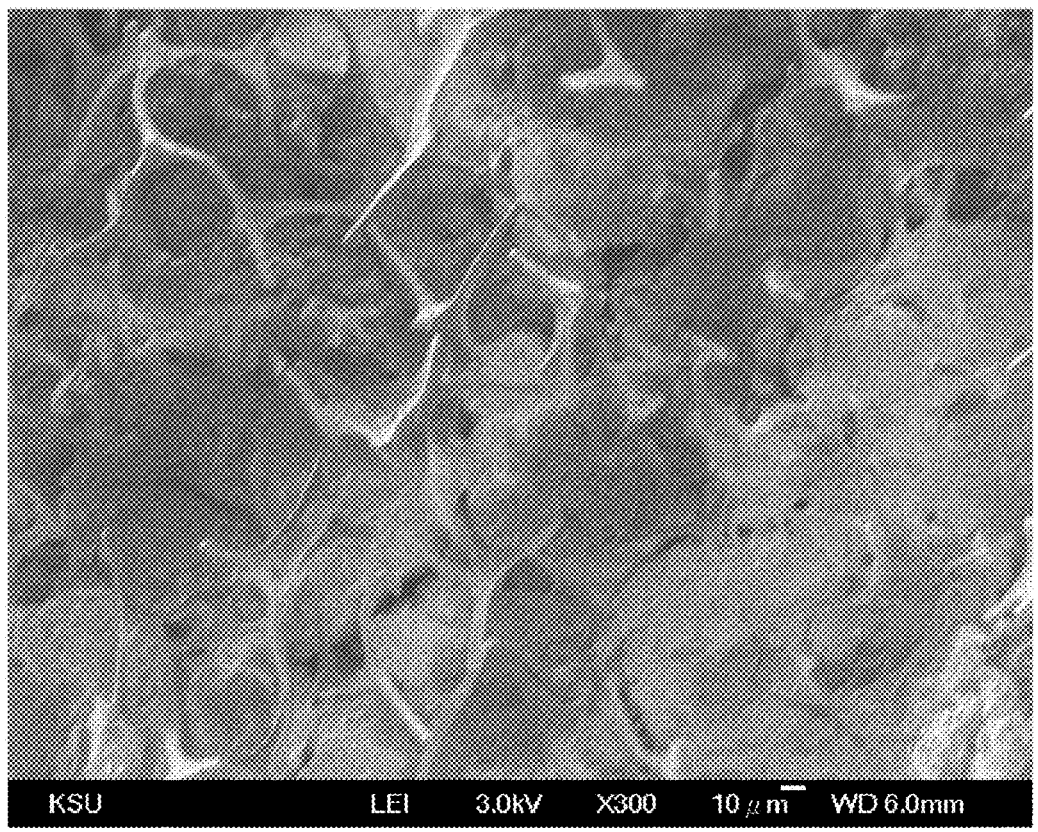
F I G . 2A

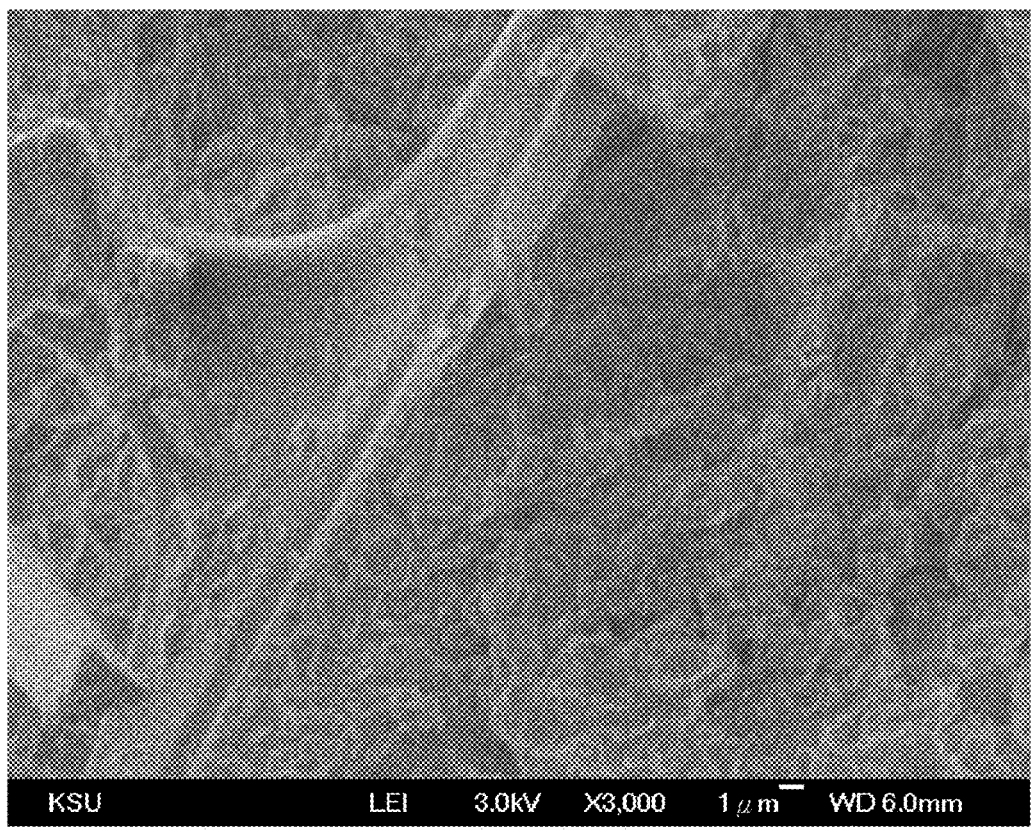
F I G . 2B

F I G . 2C

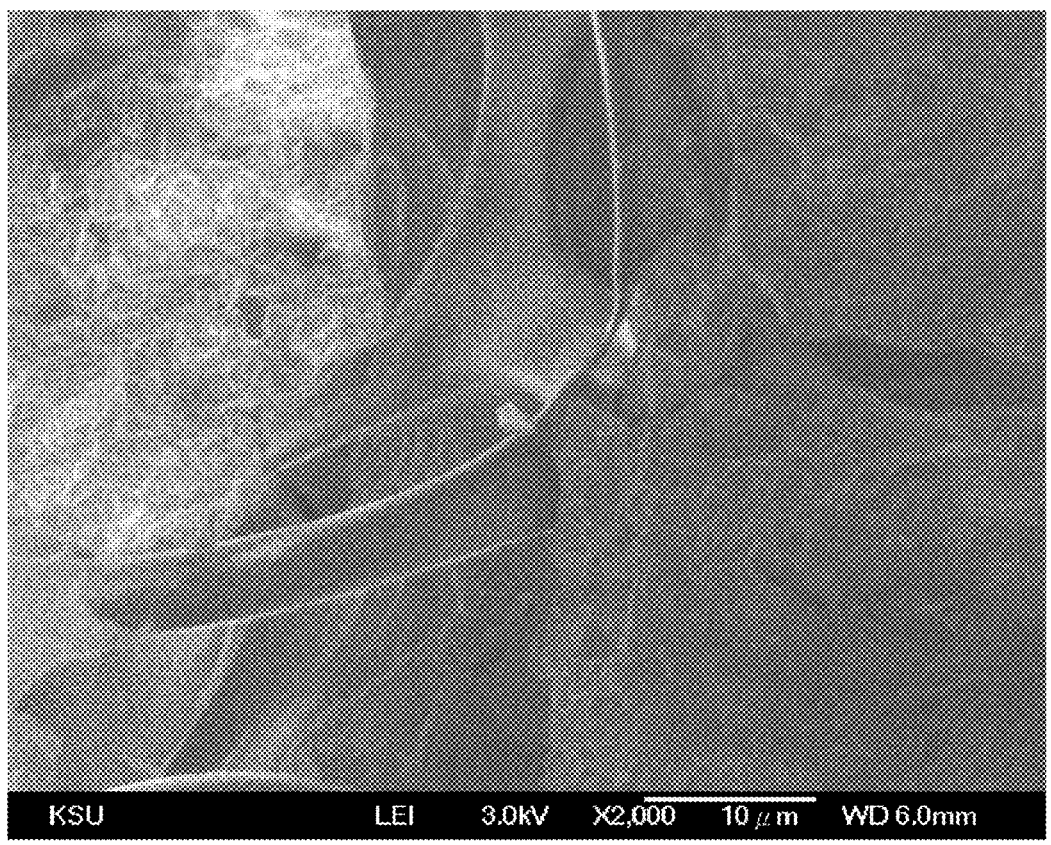
F I G . 2D

FIREPROOF MATERIAL INCORPORATING AEROGEL WITH ORGANIC FOAM MATERIAL AND METHOD FOR MAKING THE SAME

BACKGROUND OF THE INVENTION

1. Technical Field

The present invention relates to a fireproof material structure that is exceptionally heat-resistant and proof against fire, and also to a method for making the same.

2. Description of Related Art

Aerogel has many special properties such as low density, high porosity, large specific surface area, and low thermal conductivity, and is nowadays produced by sol-gel polymerization in the following manner. To begin with, a precursor such as alkoxysilane or methyl silicate is mixed with a water-containing organic solvent. Then, hydrolysis is catalyzed by adding an acid catalyst. Once hydrolysis takes place for a certain amount of time, an alkali catalyst is added to bring about condensation, producing a colloidal solution. As the molecules in the colloidal solution keep condensing and bonding with one another, a semi-solid polymeric gel is gradually formed. The gel forms a stable three-dimensional reticular structure when cured.

Conventional aerogel materials contain a large amount of water molecules and therefore need to be dried with a carbon dioxide supercritical dryer. During the drying process, liquid carbon dioxide at a temperature not higher than 34° C. is subjected to high pressure and is thus converted into the supercritical state in order for the supercritical carbon dioxide to remove water molecules from the aerogel. This drying process, however, has yet to be industrialized, and the dried aerogel is likely to crack and break and hence has limited industrial applicability. In a nutshell, the preparation of aerogel still leaves room for improvement.

For example, U.S. Pat. No. 8,029,871, entitled "method for producing silica aerogel coating" and granted on Oct. 4, 2011, discloses a silica aerogel coating produced by reacting a wet gel obtained by hydrolysis and polymerization of alkoxysilane with an organic modifying agent to form organically modified silica, dispersing the organically modified silica by an ultrasonic treatment to form an organically modified silica dispersion, adding an ultraviolet-curable resin and a photo-polymerization initiator to the dispersion to prepare a silica aerogel coating liquid, applying the coating liquid to a substrate, and then irradiating the coated layer with ultraviolet rays. Similar aerogel formations are also disclosed in Published Taiwan Invention Patent Application No. 200835648 and Taiwan Utility Model Patent No. M426798.

The afore-cited prior art, however, does not disclose a fireproof material made by incorporating aerogel with an organic foam material, or the steps and conditions required to make the same, or an improvement of such steps and conditions. The technical features and effects of the prior art cited above are therefore different from those of the present invention.

BRIEF SUMMARY OF THE INVENTION

While many patents and patent applications have disclosed applying aerogel to thermal insulation or porous-medium adsorption, none of them has disclosed making a fireproof material by incorporating aerogel with an organic foam material. In view of this, the present invention provides a fireproof material incorporating aerogel with an organic foam material and a method for making the same. By incorporating aerogel with an organic foam material, the present invention also combines the superior heat-insulating feature of porous silicate aerogel with such desirable qualities of organic foam as being arbitrarily shapable, soft, and lightweight, resulting in a light, highly fireproof, and highly flame-resistant material.

The present invention provides a fireproof material incorporating aerogel with an organic foam material and a method for making the same. The method includes the steps of: A. adding an acid catalyst into a mixed solution of a precursor and an organic solvent in order for the mixed solution to undergo hydrolysis and become an anhydrous aerogel solution, wherein the precursor is alkoxysilane or methyl silicate, the organic solvent is prepared by mixing water with ethanol, the mole ratio of the precursor to the organic solvent ranges from 1:9 to 1:18, the mole ratio of the precursor to the water in the organic solvent is lower than 1:4, the mole ratio of the precursor to the acid catalyst is 1:0.1, the hydrolysis takes 10 minutes, the mole ratio of the water in the organic solvent to the ethanol in the organic solvent ranges from 1:0.6 to 1:10, the mole fraction (mole %) of the precursor in the mixed solution ranges from 5.3% to 10.0%, and the mole fraction of the organic solvent in the mixed solution ranges from 90.0% to 94.7; B. adding an aqueous alkali catalyst solution into the anhydrous aerogel solution in order for the anhydrous aerogel solution to undergo condensation and form an aerogel solution, wherein the aqueous alkali catalyst solution is prepared from an alkali catalyst and a water solution, the mole ratio of the water in the aerogel solution to the ethanol in the aerogel solution ranges from 1:1 to 1:10, and the mole ratio of the alkali catalyst to the acid catalyst ranges from 1.5:1 to 3:1; wherein in the aerogel solution formed by the condensation, the mole fraction of the precursor ranges from 3.45% to 0.824%, the mole fraction of the organic solvent ranges from 96.536% to 98.97%, the mole fraction of the acid catalyst ranges from 0.004% to 0.083%, the mole fraction of the alkali catalyst ranges from 0.01% to 0.123%, and the mole ratio of the alkali catalyst to the acid catalyst is 3:1; and wherein the condensation takes 10 minutes; C. impregnating the organic foam material with the aerogel solution in order for the aerogel to be generated by gelation and be incorporated with the organic foam material to form a three-dimensional reticular structure, wherein the gelation takes 3 minutes; and D. drying and then shaping the organic foam material incorporated with the aerogel to form the fireproof material.

The acid catalyst is a weak acid or a strong acid selected from acetic acid, citric acid, oxalic acid, phosphoric acid, hydrochloric acid, sulfuric acid, and benzenesulfonic acid, while the alkali catalyst is an alkali selected from $NH_4OH$, $NaOH$, $NaHCO_3$, $CaCO_3$ and $KOH$.

The organic foam material is one or a combination of melamine, polyurethane, polyurea, polyurea formaldehyde, and poly-melamine-formaldehyde.

In step D, the drying is carried out by directly heating the organic foam material incorporated with the aerogel in a heating tank to 68° C. to 82° C. such that the ethanol and the water in the wet gel system (including the organic foam material and the aerogel incorporated therewith) in the heating tank form an azeotrope and are dried through evaporation. The drying time ranges from 30 minutes to 2 hours, depending on the volume of the organic foam material incorporated with the aerogel.

The present invention also provides a fireproof material incorporating aerogel with an organic foam material, as made by the method described above. The percentage by volume of the aerogel in the fireproof material ranges from 60% to 80%. The percentage by volume of the organic foam material in the fireproof material ranges from 20% to 40%.

The foregoing technical features have the following advantages:

1. The fireproof material incorporates aerogel with an organic foam material and thereby integrates the superior heat-insulating property of porous silicate aerogel with the mechanical properties and softness of organic foam. The fireproof material can be mass-produced under normal conditions (i.e., normal temperature and normal pressure) and be used in fireproof walls of various buildings, in lightweight fireproof partitions, or as a sound- and heat-insulating, fire-resistant material in cars.

2. The time required for hydrolysis can be adjusted by changing the concentration of the acid catalyst, and the time required for condensation, by changing the alkali catalyst content. That is to say, the time required for production can be shortened as needed.

3. The organic foam material is made of one or a combination of melamine, polyurethane, polyurea, polyurea formaldehyde, and poly-melamine-formaldehyde, and is impregnated in such a way that the resulting aerogel is incorporated with the organic foam material, that the aerogel and the organic foam material jointly form a three-dimensional interlaced reticular structure, and that the aerogel is kept from separating from the organic foam material.

4. The percentage by volume of the aerogel in the fireproof material incorporating the aerogel with the organic foam material can be adjusted, e.g., by rendering the mole fraction of alkoxysilane or methyl silicate in the gel higher than 0.16%, in order for the fireproof material incorporating the aerogel with the organic foam material to be heat-insulating, fireproof, and applicable to green buildings as a fireproof, heat-insulating, and fire-resistant material.

5. The organic foam material incorporated with the aerogel is dried by being heated to 68° C. to 82° C. in a high-temperature solvent heating tank, in order for the ethanol and the water in the wet gel system (including the organic foam material and the aerogel incorporated therewith) in the heating tank to form an azeotrope and dry by evaporation. This allows the fireproof material incorporating the aerogel with the organic foam material to be mass-produced for use as an indoor heat-insulating and fire-resistant material or an indoor fireproof material.

6. The fireproof material can be produced with ease and at low cost because the organic foam material can be fully incorporated with the aerogel without adding any flame retardant.

BRIEF DESCRIPTION OF THE SEVERAL VIEWS OF THE DRAWINGS

FIG. 1 is a flowchart showing the steps of the present invention; and

FIG. 2a-FIG. 2d shows electron microscope photos of the fireproof material incorporating aerogel with an organic foam material in an embodiment of the present invention.

DETAILED DESCRIPTION OF THE INVENTION

The present invention provides a method for making a fireproof material that incorporates aerogel with an organic foam material. According to an embodiment of the present invention as shown in FIG. 1, the method includes the following steps:

A. An acid catalyst is added into a mixed solution of a precursor and an organic solvent such that hydrolysis takes place, turning the mixed solution into an anhydrous aerogel solution. In this embodiment, the precursor is alkoxysilane or methyl silicate, and the organic solvent is prepared by mixing water with ethanol. More specifically, the alkoxysilane is tetraethoxysilane (TEOS). As to the mixing ratios, the mole ratio of the precursor (i.e., TEOS) to the organic solvent ranges from 1:9 to 1:18, the mole ratio of the precursor to the water is lower than 1:4, and the mole ratio of the precursor to the acid catalyst ranges from 1:0.001 to 1:0.1. Once added with the acid catalyst, the mixed solution is stirred at room temperature in order for a hydrolysis reaction to take place, in which water molecules react with the TEOS to produce ethanol, transforming the system into an anhydrous aerogel solution As mentioned above, the organic solvent is prepared by mixing water with ethanol, and the mole ratio of the water to the ethanol ranges from 1:0.6 to 1:10. In addition, the mole fraction (mol %) of the precursor in the mixed solution ranges from 5.3% to 10.0%, and the mole fraction of the organic solvent in the mixed solution ranges from 90.0% to 94.7%. As the mole ratio of the precursor to the acid catalyst can be anywhere between 1:0.001 and 1:0.1, it is worth mentioning that the acid catalyst content will affect the time required for hydrolysis. For example, the time required for hydrolysis is about 300 minutes when the mole ratio of the precursor to the acid catalyst is 1:0.001, and is about 10 minutes when the mole ratio of the precursor to the acid catalyst is 1:0.1.

The hydrolysis reaction occurs at room temperature while stirring continues. Preferably, the hydrolysis reaction lasts for 10 to 120 minutes. The time required for hydrolysis shortens as the mole ratio of the acid catalyst is increased. During the hydrolysis, water molecules react with the precursor (e.g., alkoxysilane or methyl silicate) to produce ethanol such that the system is converted into an anhydrous aerogel solution. The acid catalyst is a weak acid or a strong acid selected from acetic acid, citric acid, oxalic acid, phosphoric acid, hydrochloric acid, sulfuric acid, and benzenesulfonic acid. The purpose of using an alcohol, acid, ether, or ester here is to modify the mixing ratios according to the hydrophilicity/hydrophobicity of the organic foam substrate. An alcohol, acid, ether, or ester is chosen because such solvents are miscible with one another.

B. An aqueous alkali catalyst solution is added into the anhydrous aerogel solution such that condensation occurs, turning the anhydrous aerogel solution into an aerogel solution. More specifically, the aqueous alkali catalyst solution is prepared from an alkali catalyst and a water solution. The mole ratio of the alkali catalyst to the acid catalyst ranges from 1.5:1 to 3:1. Once the aqueous alkali catalyst solution is added into the anhydrous aerogel solution, the latter undergoes a condensation reaction and forms an aerogel solution. The alkali catalyst is an alkali selected from $NH_4OH$, $NaOH$, $NaHCO_3$, $CaCO_3$ and $KOH$ while the water solution is one or a combination of pure water, filtered water, and water that has been treated twice. The alkali catalyst content influences the time required for condensation. For example, the time required for condensation is about 1100 minutes when the mole ratio of the alkali catalyst to the acid catalyst is 1:1, and is about 3 minutes when the mole ratio of the alkali catalyst to the acid catalyst is 3:1. The time required for condensation shortens as the mole ratio of the alkali catalyst is increased. The mole ratio of the water in the aerogel solution to the ethanol in the aerogel solution ranges from 1:1 to 1:10, and the mole ratio of the alkali catalyst to the acid catalyst ranges from 1.5:1 to 3:1. Moreover, in the aerogel solution formed by condensation, the mole fraction of the precursor ranges from 3.45% to 0.824% (based on 1 mole of precursor), the mole fraction of the organic solvent ranges from 96.536% to 98.97% (based on 28 to 120 moles of organic solvent), the mole fraction of the acid catalyst ranges from 0.004% to 0.083% (based on 0.001 to 0.1 mole of acid catalyst), and the mole fraction of the alkali catalyst ranges from 0.01% to 0.123% (based on 0.003 to 0.15 mole of alkali catalyst). When the mole ratio of the alkoxysilane or methyl silicate to the water in organic solvent is lower than 1:4, the four side chains of $Si(OR)_4$ in the alkoxysilane or methyl silicate structure will not be hydrolyzed completely, and because of that, the resulting aerogel structure contains hydrophobic groups, which facilitate incorporation of the aerogel with organic foam.

C. An organic foam material is impregnated with the aerogel solution such that aerogel is generated by gelation and is incorporated with the organic foam material, forming a three-dimensional reticular structure. More specifically, the organic foam material is soaked in the aerogel solution, allowing the aerogel solution to seep into and interlace with the organic foam material sufficiently. As a result, the aerogel and the organic foam material jointly form a three-dimensional interlaced reticular structure. The time required for gelation is about 1100 minutes when the mole ratio of the alkali catalyst to the acid catalyst is 1:1, and is shortened to about 3 minutes when the mole ratio of the alkali catalyst to the acid catalyst is 3:1, meaning the time required for impregnating the organic foam material can be controlled by adjusting the mole ratio of the alkali catalyst to the acid catalyst. The term "organic foam material" as used herein refers to a porous or reticular structure formed by foaming one or a combination of melamine, polyurethane, polyurea, polyurea formaldehyde, and poly-melamine-formaldehyde, wherein the foaming process can be carried out by a mechanical, chemical, or heating means or through a necessary reaction in order for the organic foam material to bind with the aerogel securely, preventing the aerogel from separating from the organic foam material.

D. The organic foam material incorporated with the aerogel is dried and then shaped to form a fireproof material. More specifically, the organic foam material obtained from the previous step (which is incorporated with the aerogel) is directly heated in a heating tank to 68° C. to 82° C. such that the ethanol and the water in the wet gel system (including the organic foam material and the aerogel incorporated therewith) in the heating tank form an azeotrope and are dried through evaporation. This process can remove all the ethanol and water in the aerogel-incorporated organic foam material, and the drying time is 30 minutes to 2 hours. Also, the dried aerogel is less likely to crack and break, and consequently a higher yield can be achieved, than when the conventional drying method is used. When all the moisture has evaporated, a fireproof material incorporating the aerogel with the organic foam material is obtained. Alternatively, the aerogel can be pressed into the organic foam material by a continuous rolling process. As the organic foam material is a reticular structure with a large number of pores in the first place, the aerogel gels in the pores of the organic foam material after the organic foam material is impregnated with the aerogel solution. Once the organic solvent is subsequently dried, the aerogel itself forms a reticular structure with a large number of pores, too. Thus, the organic foam material and the aerogel jointly form a three-dimensional interlaced reticular structure. FIG. 2a-FIG. 2d shows scanning electron microscope (SEM) photos of a fireproof material incorporating aerogel with an organic foam material, wherein photos (a) through (d) are microscopic photos showing the surface of the fireproof material at different magnifications. The photos demonstrate that the pores of the reticular structure of the organic foam material are filled with aerogel, that the aerogel forms a porous reticular structure, and that the aerogel-incorporated organic foam material forms a three-dimensional interlaced reticular structure.

The impregnation step allows different products to be made according to the silicate content of the aerogel solution used for impregnation. When the mole fraction of alkoxysilane to the total solution is lower than 1.64% (i.e., when 1 mole of alkoxysilane is used in conjunction with more than 60 moles of organic solvent), the resulting fireproof material has a relatively low aerogel content and relatively large pores, provides relatively good thermal insulation, and is suitable for use as a highly heat-insulating green construction material. Such a mixing ratio, therefore, makes it possible to use a relatively small amount of aerogel and achieve thermal insulation at low cost.

When the mole fraction of alkoxysilane to the total solution is higher than 1.64% (i.e., when 1 mole of alkoxysilane is used in conjunction with less than 60 moles of organic solvent), the resulting fireproof material has a relatively high aerogel content and relatively small pores, provides relatively high fireproofness, and is suitable for use as a fireproof partition in buildings. A fireproof material incorporating aerogel with an organic foam material not only preserves the original look and lightness of the organic foam material, but also possesses the desirable heat-insulating and fireproof properties of the aerogel such that the fireproof material is both heat-insulating and fireproof and therefore suitable for use as a heat-insulating or fireproof material in buildings.

Test results show that a fireproof material made according to the present invention can resist fire for more than 20 minutes in 800° C. flames. More specifically, the fireproof materials under test succeeded in blocking flames and their heat completely and keeping the organic foam material from burning. This proves that the disclosed fireproof material incorporating aerogel with an organic foam material is indeed capable of insulating heat and resisting fire.

The present invention also provides a fireproof material incorporating aerogel with an organic foam material as is made by the method described above. The fireproof material includes an organic foam material and aerogel, wherein the aerogel is incorporated with the organic foam material and forms a three-dimensional reticular structure. The percentage by volume of the aerogel in the fireproof material ranges from 60% to 80% while the percentage by volume of the organic foam material in the fireproof material ranges from 20% to 40%.

According to test results, fireproof materials made according to the present invention by incorporating aerogel with an organic foam material have an average LOI (limiting oxygen index) value higher than 55, feature grade-1 fireproofness and flame resistance, do not release toxic gases during combustion, are safe and stable, and can therefore be used as fireproof, heat-insulating materials for green buildings. The limiting oxygen index (LOI) values obtained from the tests are tabulated as follows:

TABLE 1

Limiting oxygen index (LOI) test results of fireproof material samples made according to an embodiment of the present invention

| | Sample | LOI value | Average LOI value |
|---|---|---|---|
| Fireproof materials made by incorporating aerogel with organic foam through complete impregnation | Whole-MF1<br>Whole-MF2<br>Whole-MF3<br>Whole-MF4<br>Whole-MF5 | >55<br>>55<br>>55<br>>55<br>>55 | >55<br>(non-inflammable) |

The present invention incorporates aerogel with an organic foam material to produce a fireproof material that not only integrates the heat-insulating property of aerogel, which is porous, with the desirable properties of organic foam, but also is mass-producible and has industrial applicability. Moreover, the acid catalyst content in the present invention can be modified to adjust the time required for hydrolysis, and the alkali catalysis content of the anhydrous aerogel solution can be changed to adjust the time required for condensation and gelation, thereby controlling the time required for impregnating the organic foam material. The aerogel in the present invention seeps into the organic foam material and forms a three-dimensional reticular structure in the pores of the organic foam material as well as on the foam surface such that the aerogel will not separate from the organic foam material easily but keep the fireproof material highly proof against fire. Thus, by incorporating aerogel with an organic foam material, the present invention provides a material qualifying as a heat-insulating and fireproof material for buildings.

The embodiments described above are but two preferred ones of the present invention and should not be construed as restrictive of the scope of patent protection sought by the applicant. All simple equivalent changes and substitutions made according to the appended claims and the disclosure of this specification should fall within the scope of the present invention.

What is claimed is:

1. A method for making a fireproof material incorporating aerogel with an organic foam material, the method comprising the steps of:

A. adding an acid catalyst into a mixed solution of a precursor and an organic solvent in order for the mixed solution to undergo hydrolysis and become an anhydrous aerogel solution, wherein the precursor is alkoxysilane or methyl silicate, the organic solvent is prepared by mixing water with ethanol, the mole ratio of the precursor to the organic solvent ranges from 1:9 to 1:18, the mole ratio of the precursor to the water in the organic solvent is lower than 1:4, the mole ratio of the precursor to the acid catalyst ranges from 1:0.001 to 1:0.1, the mole ratio of the water in the organic solvent to the ethanol in the organic solvent ranges from 1:0.6 to 1:10, the mole fraction of the precursor in the mixed solution ranges from 5.3% to 10.0%, and the mole fraction of the organic solvent in the mixed solution ranges from 90.0% to 94.7%;

B. adding an aqueous alkali catalyst solution into the anhydrous aerogel solution in order for the anhydrous aerogel solution to undergo condensation and form an aerogel solution, wherein the aqueous alkali catalyst solution is prepared from an alkali catalyst and a water solution, the mole ratio of the water in the aerogel solution to the ethanol in the aerogel solution ranges from 1:1 to 1:10, and the mole ratio of the alkali catalyst to the acid catalyst ranges from 1:1 to 3:1; and wherein in the aerogel solution formed by the condensation, the mole fraction of the precursor ranges from 3.45% to 0.824%, the mole fraction of the organic solvent ranges from 96.536% to 98.97%, the mole fraction of the acid catalyst ranges from 0.004% to 0.083%, and the mole fraction of the alkali catalyst ranges from 0.01% to 0.123%;

C. impregnating the organic foam material with the aerogel solution in order for the aerogel to be generated by gelation and be incorporated with the organic foam material, forming a three-dimensional reticular structure; and D. drying and then shaping the organic foam material incorporated with the aerogel to form the fireproof material.

2. The method of claim 1, wherein in the step A, the hydrolysis takes 10 to 300 minutes; when the mole ratio of the precursor to the acid catalyst is 1:0.001, the hydrolysis takes 300 minutes; and when the mole ratio of the precursor to the acid catalyst is 1:0.1, the hydrolysis takes 10 minutes.

3. The method of claim 1, wherein the acid catalyst is a weak acid or a strong acid selected from acetic acid, citric acid, oxalic acid, phosphoric acid, hydrochloric acid, sulfuric acid, and benzenesulfonic acid, and the alkali catalyst is an alkali selected from $NH_4OH$, $NaOH$, $NaHCO_3$, $CaCO_3$ and $KOH$.

4. The method of claim 1, wherein in the step B, the condensation takes 10 to 1100 minutes; when the mole ratio of the alkali catalyst to the acid catalyst is 1:1, the condensation takes 1100 minutes; and when the mole ratio of the alkali catalyst to the acid catalyst is 3:1, the condensation takes 10 minutes.

5. The method of claim 1, wherein the organic foam material is one or a combination of melamine, polyurethane, polyurea, polyurea formaldehyde, and poly-melamine-formaldehyde.

6. The method of claim 1, wherein in the step C, the gelation takes 3 to 1100 minutes; when the mole ratio of the alkali catalyst to the acid catalyst is 1:1, the gelation takes 1100 minutes; and when the mole ratio of the alkali catalyst to the acid catalyst is 3:1, the gelation takes 3 minutes.

7. The method of claim 1, wherein in the step D, the drying is performed by directly heating the organic foam material incorporated with the aerogel in a heating tank to 68° C. to 82° C. such that ethanol and water in a wet gel system in the heating tank form an azeotrope and are dried through evaporation, the wet gel system includes the organic foam material and the aerogel incorporated therewith, and the drying takes 30 minutes to 2 hours, depending on the volume of the organic foam material incorporated with the aerogel.

* * * * *